(12) United States Patent
Jurenka et al.

(10) Patent No.: US 6,578,441 B1
(45) Date of Patent: Jun. 17, 2003

(54) CRANE TESTING APPARATUS AND ASSOCIATED LOAD TESTING METHOD

(75) Inventors: Frank J. Jurenka, Sagle, ID (US); Keith P. Thomas, Rathdrum, ID (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 188 days.

(21) Appl. No.: 09/826,265

(22) Filed: Apr. 5, 2001

(51) Int. Cl.[7] ............................ G01N 3/06; G01M 19/00
(52) U.S. Cl. ...................... 73/865.9; 73/826; 73/862.56; 212/278
(58) Field of Search ................................ 73/865.9, 826, 73/862.56, 862.57; 212/276, 278

(56) References Cited

U.S. PATENT DOCUMENTS

| 3,631,537 A | * 12/1971 | Zibolski et al. | 73/1.15 X |
| 4,303,164 A | * 12/1981 | Andersson et al. | 212/272 |
| 4,509,377 A | * 4/1985 | Mentzell et al. | 73/862.56 |
| 4,697,458 A | * 10/1987 | Billstein | 73/865.9 X |

FOREIGN PATENT DOCUMENTS

| SU | 378746 | * 4/1977 | 73/862.56 |
| SU | 933619 | * 6/1982 | 73/862.56 |

OTHER PUBLICATIONS

Derwent–Acc–No: 1986–244216 Abstract of SU 1207990 A Jan. 1986 "Test Weights Assembly–has Column Secured to Base Plate by Welded Discs, and Weights Made with Recesses for Locking Bars" Ivanov et al.*

Derwent–Acc–No: 1988–262858 Abstract of SU 1377240 A Feb. 1988 "Wt. Lifting Mechanism Test Wt.—has Nested Weights with Twist Locking Lifting Bar to Remove or Add Weights as Necessory" Paduchikh.*

Derwent–Acc–No; 1988–269865 Abstract of SU 1379639 A Mar. 1988 "Crane Hydraulic Weighing Devices—Uses Manometer to Register Pressure in Fluid Proportional to Weight" Verevkin.*

* cited by examiner

Primary Examiner—Thomas P. Noland
(74) Attorney, Agent, or Firm—Jacob Shuster

(57) ABSTRACT

Two groups of test weights are stacked on a horizontal base frame transported to an aligned position underlying a crane to be tested for loading capacity. Such base frame is loaded with the test weights stacked thereon after assembly into a test apparatus by removable attachment through intermediate lift beams to an upper main lift beam through which such loading is transmitted directly to the crane.

5 Claims, 3 Drawing Sheets

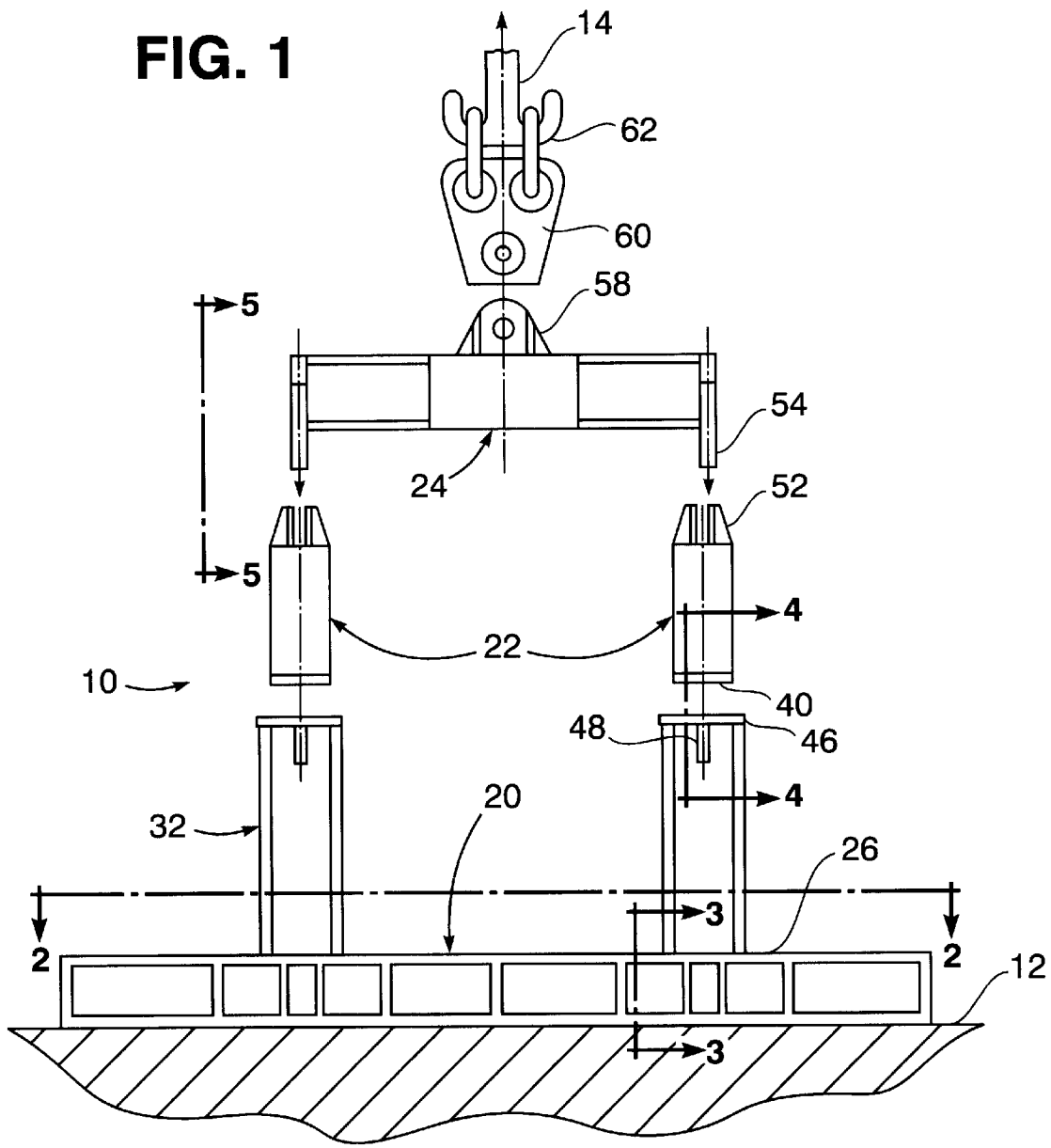

CRANE TESTING APPARATUS AND ASSOCIATED LOAD TESTING METHOD

The present invention relates in general to the testing of cranes for loading capacity.

BACKGROUND OF THE INVENTION

The testing of cranes in regard to their load weight capacity typically involves use of either one large fixed weight or a plurality of smaller individual weights. As to use of a single large fixed weight for crane testing, it was limited to testing of only one correspondingly sized crane, and imposed high loading conditions on the support floor as well as to create transport and storing problems. In regard to crane load testing by use of plural individual weights, attachment of such weights to the crane involved use of rigging gear, such as shackles and wire rope slings, for crane pick up of the weights. Cluster assembly resulted therefrom, that was very cumbersome and dangerous especially in view of varying rigging hardware lengths and distances between the crane attachment point and the respective individual weights. Often, the rigging hardware for all weights did not directly fit into the crane attachment hook, so as to create a need for intermediate rigging hardware detracting from the otherwise available crane lift height. It is therefore an important object of the present invention to provide apparatus for a more versatile method of load testing a wide variety of different types and sizes of cranes in a less cumbersome and less costly manner.

SUMMARY OF THE INVENTION

In accordance with the present invention, a crane load testing device is assembled from three basic structural components, consisting of: a generally rectangular load carrying base frame having four vertical frame posts attached thereto by welding; a pair of intermediate beams respectively adapted to be removably attached by bolts to a pair of the vertical frame posts for horizontal extension therebetween; and a main lift beam removably attachable to said pair of intermediate beams and having a pod through which attachment of the main lift beam to the crane may be effected. A plurality of relatively heavy weight loads may thereby be positioned on the base frame between its spaced frame posts, while additional weights of less weight may be vertically stacked on the base frame at outer locations thereon on the other sides of such frame posts.

The foregoing arrangement of the crane load testing device enables it to be more readily stored before transport in its disassembled condition to some desired location below a crane. In such disassembled condition of the testing device, its load carrying base frame allows the load weights to be spread out over a large area to reduce floor loading density. The main lift beam which is thereafter removably attached to complete assembly enables secure retention of load weights on the base frame as well as direct and secure transmittal of such loading on the base frame to a wide variety of cranes without entangling rigging hardware. Easy assembly and removable attachment of the main lift beam to the base frame posts through the intermediate lift beams facilitates the stacking of load weights on the base frame, including the stacking or removal of additional load weights to accommodate different loading requirements.

BRIEF DESCRIPTION OF DRAWING

A more complete appreciation of the invention and many of its attendant advantages will be readily appreciated as the same becomes better understood by reference to the by following detailed description when considered in connection with the accompanying drawing wherein:

FIG. 1 is a side elevation view of a crane load testing device in accordance with one embodiment of the invention, in its disassembled condition;

DETAILED DESCRIPTION OF PREFERRED EMBODIMENT

Figure 1A:
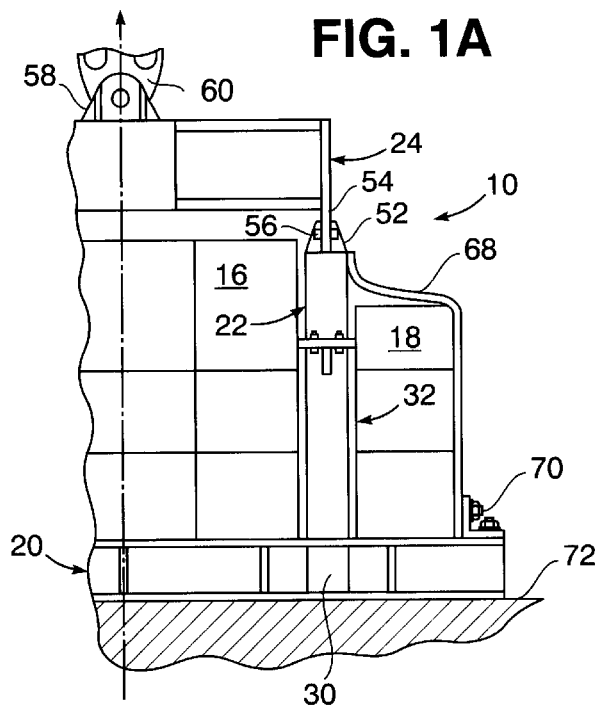
FIG. 1A is a partial side elevation view of the crane load testing device in its assembled condition, with test load weights carried therein.

Referring now to the drawing in detail, FIGS. 1 and 1A illustrate a crane load testing device 10 disposed on a support floor 12 below a crane (not shown) from which it is to be suspended by a crane hook 14. FIG. 1 shows the load testing device in a disassembled condition, while FIG. 1A shows such device 10 fully assembled with a group of heavier test load weights 16 positioned thereon at a middle stack location between two groups of additional vertically stacked load weights 18 at end stack locations as hereinafter explained.

Figure 3:
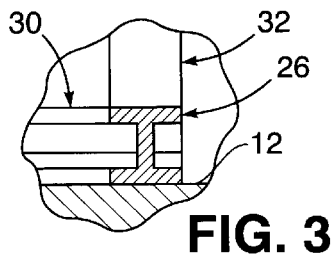
FIGS. 2, 3, 4 and 5 are partial section views respectively taken substantially through planes indicated by section lines 2—2, 3—3, 4—4 and 5—5 in FIG. 1.
Figure 2:
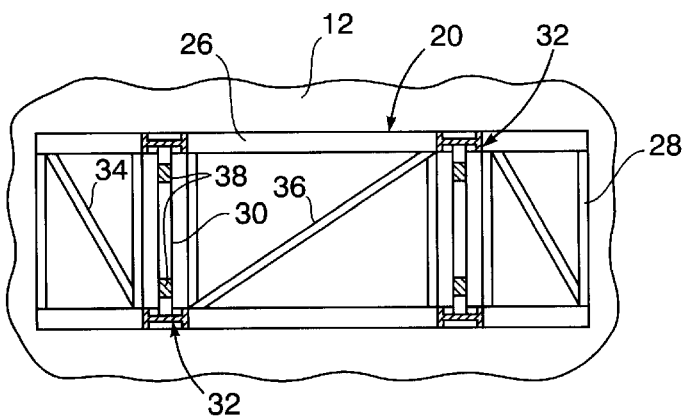

With continued reference to FIG. 1 showing the load testing device 10 disassembled, three basic components form such device 10, consisting of: a lower base frame 20; a pair of intermediate lift beams 22; and an upper main lift beam 24. As shown in FIG. 2, the base frame 20 is generally rectangular in a horizontal plane formed by parallel spaced elongated side frame members 26 suitably interconnected, by welding for example, at opposite ends thereof with end frame members 28, for positioning support on the flat horizontal surface of the floor 12. Such side frame members 26, as shown in FIGS. 2 and 3, are also firmly attached as by welding at locations intermediate the ends thereof, to a pair of spaced cross beams 30 at which four vertical frame posts 32 extend upwardly therefrom. Such frame posts 32 are firmly attached at their bottom ends, as by welding, to the side frame members 26 of the base frame 20. A pair of interior cross bracing members 34 extend diagonally from the interconnection corners of the end and side beams 26 and 28 to the interconnection locations between the side beams 26 and the cross beams 30, while a diagonal brace 36 extends between the side beams 26 and the pair of cross beams 30, as also shown in FIG. 2. Also, pairs of such bracings 38 extend between the pair of frame posts 32 at the ends of each pair of the cross beams 30, so as to establish a high strength type of metallic base frame 20 made of steel for example.

Figure 4:
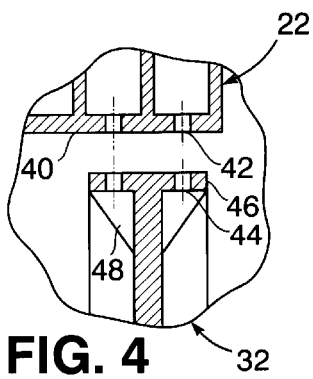
Figure 4A:
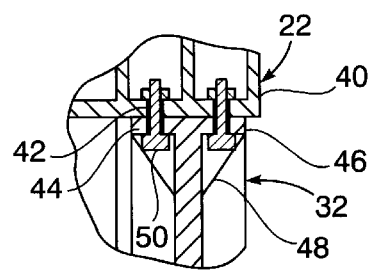
FIG. 4A is a partial section view similar to that of FIG. 4, in the assembled condition of the crane load testing device.

Referring now to FIGS. 1, 1A, 4 and 4A, each of the two intermediate lift beams 22, also made of metal such as steel, has a bottom flange 40 provided with a pair of closely spaced apertures 42 for alignment with apertures 44 formed in flanges 46 at the upper ends of each of the frame posts 32, as shown in FIGS. 4 and 4A. The frame posts 32 have an I-beam cross-section with reinforcement formations 48 extending from the upper flanges 46 to be removably attached by bolts 50, extending through the apertures 44 and 42, to the bottom 40 of the intermediate lift beam 22.

Figure 5:
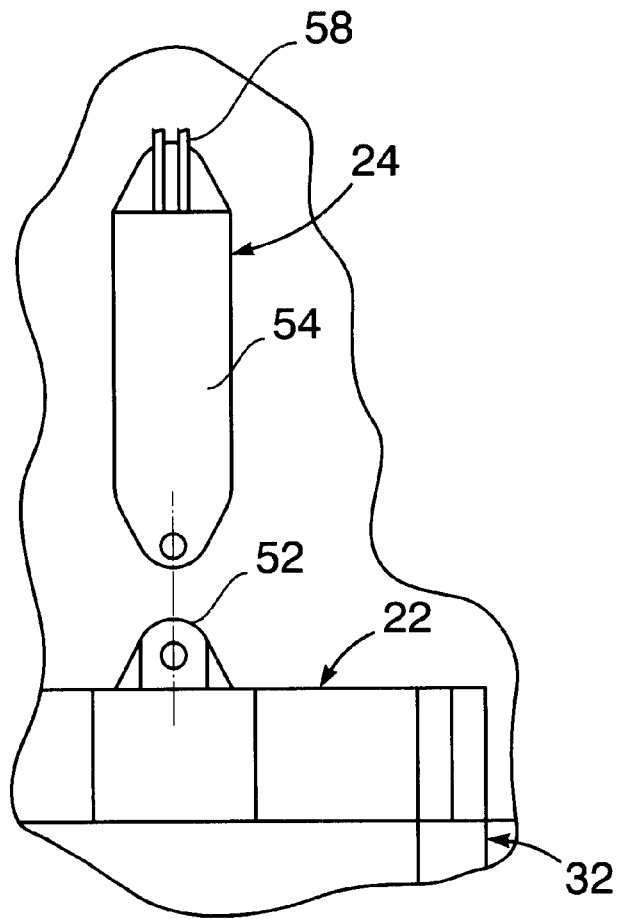

As shown in FIGS. 1 and 5, each of the intermediate lift beams 22 has projecting from the top thereof, intermediate its opposite longitudinal ends, a pair of closely spaced pivot attachment formations 52 to be aligned with and receive therebetween the lower end portions of end plates 54 extending downwardly from the opposite longitudinal ends of the upper main lift beam 24 as shown in FIG. 1A. End pins 56 accordingly removably interconnect the main lift beam 24 with the pair of intermediate lift beams 22 through the end plates 54 and the attachment formations 54.

The main lift beam 24 as shown in FIGS. 1 and 1A also has a pad eye 58 projecting upwardly therefrom intermediate opposite longitudinal ends thereof through which various presently available attachment options may be utilized for pivotal suspension of the assembled device 10 from a crane. The attachment option shown by way of example in FIG. 1 includes a load transfer plate 60 having one aperture in its lower end portion through which it is pinned to the main lift beam 24 by the pad eye 58 as shown in FIG. 1A. The upper portion of such load transfer plate 60, as shown in FIG. 1, has a pair of openings through which it may be suspended from the crane by a pair of shackles 62 and crane hooks 14. Other crane attachment options could instead be utilized, involving more direct attachment of a crane, with a single hook or a hook having a load pin hole, to the pad eye 58 by means of a pin, wherein such crane hook is directly positioned within the pad eye 58.

Figure 6:
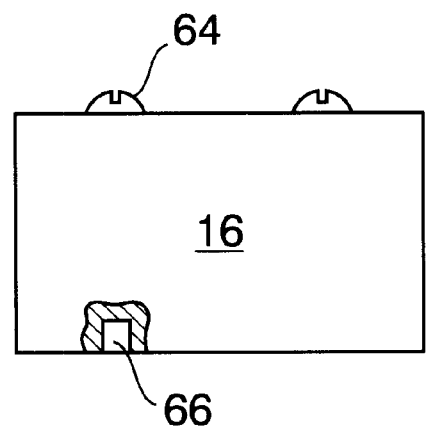
FIG. 6 is a side elevation view, with a portion shown in section, of one of the test load weights.

It will be apparent from the foregoing description that when the load testing device 10 is disassembled as shown in FIG. 1, the base frame 20, the intermediate lift beams 22 and the main lift beam 24 may be separately stored for transport to a desired location such as the support surface of the floor 12 in underlying alignment below a crane from which the hook 14 extends. When the load testing device 10 is partially assembled, the heavier test loads 16, which may respectively weigh 20,000 lbs., are readily stacked on the base frame 20 between the frame posts 32. The additional load weights 18, weighing 10,000 lbs. for example, may then be stacked on the other sides of such frame posts 32 before the device 10 is fully assembled as shown in FIG. 1A, with the main lift beam 24 removably attached as hereinbefore described so as to enable load changing as well to accommodate testing of a wide variety of crane types and sizes. FIG. 6 illustrates one of the test load weights 16, having tabs 64 on the top thereof and holding pin openings 66 formed in the bottom thereof through which the test weight may be retained on the base frame 20. When the assembled device 10 is loaded with the additional weights 18 as shown in FIG. 1A, such weights 18 may be firmly retained in stacked position by tie-down straps 68 attached at their upper ends to the intermediate lift beams 22 and at their lower ends anchored by clips 70 to the ends of the base frame 20.

Obviously, other modifications and variations of the present invention may be possible in light of the foregoing teachings. It is therefore to be understood that within the scope of the appended claims the invention may be practiced otherwise than as specifically described.

What is claimed is:

1. Apparatus for load testing of a crane having a hook suspended therefrom, comprising: lift beam means for direct transmittal of loading by testing weights to the crane through the hook; a base frame supportingly positioned in underlying alignment below the crane on which said testing weights are disposed; and intermediate means removably attaching the base frame to the lift beam means for assembly of the apparatus and accommodating transfer of the testing weights to the positioned base frame before said direct transmittal of the loading by the lift beam means to the crane.

2. The apparatus as defined in claim 1, wherein the base frame, the intermediate means and the lift beam means are respectively separately stored and transported to enable said assembly on the positioned base frame.

3. The apparatus as defined in claim 2, wherein said base frame includes a pair of posts between which heavier groups of the testing weights are stacked; and the intermediate means includes means for selectively attaching the posts to the lift beam means.

4. The apparatus as defined in claim 1, wherein said base frame includes a pair of posts between which heavier groups of the testing weights are stacked; and the intermediate means includes means for selectively attaching the posts to the lift beam means.

5. In combination with a crane having a hook suspended therefrom a method of testing the crane by loading thereof with a plurality of test weights, comprising the steps of: positioning said test weights on a support surface at a location in underlying alignment below the crane; and assembling facilities on the hook and the support surface at said location for transmittal of the loading by the test weights on said support surface directly to the crane through said hook; said positioning of the test weights being effected by stacking thereof on the support surface formed on a base frame which is transported with said facilities to said location in underlying alignment below the crane.

* * * * *